Patented Oct. 29, 1935

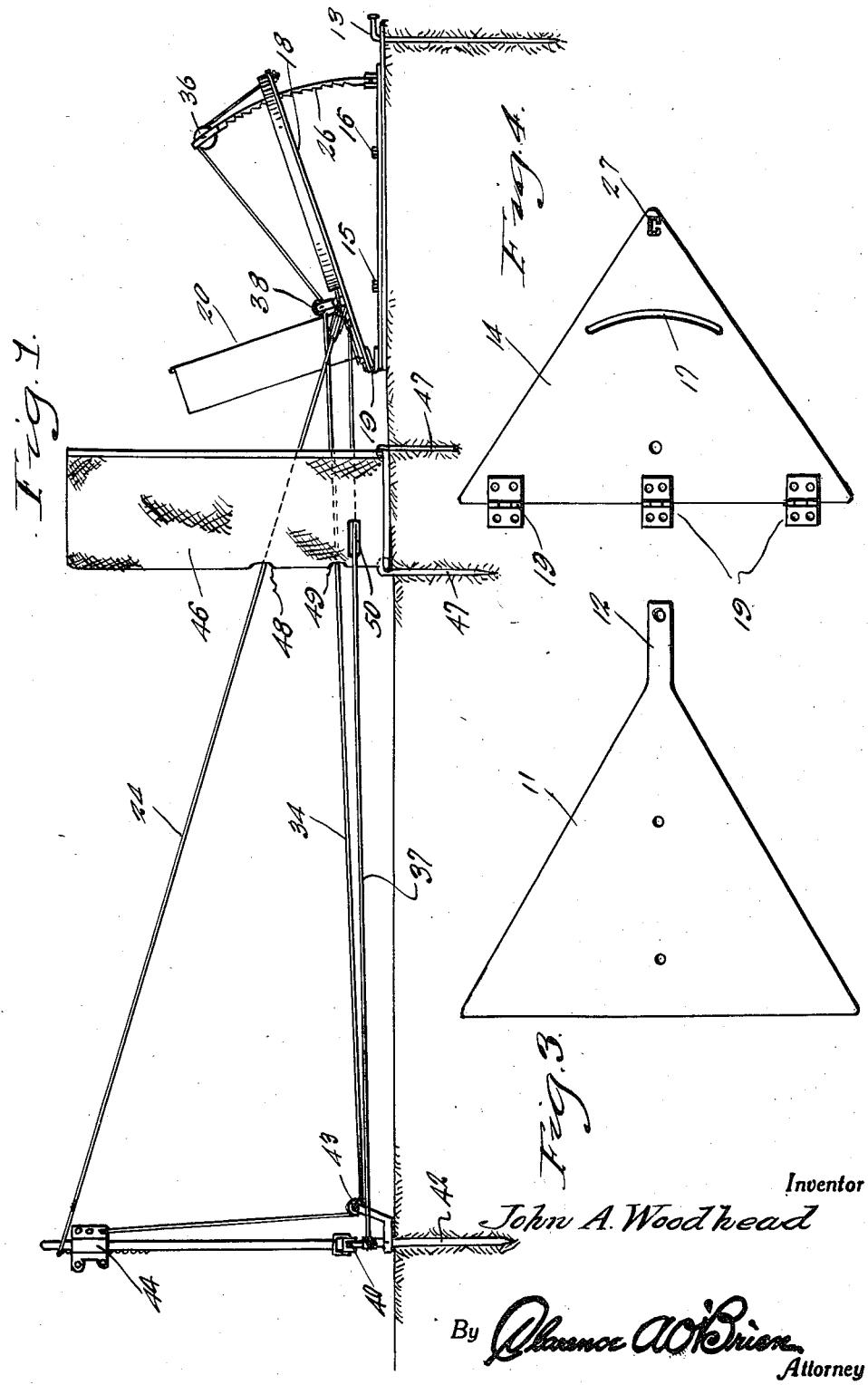

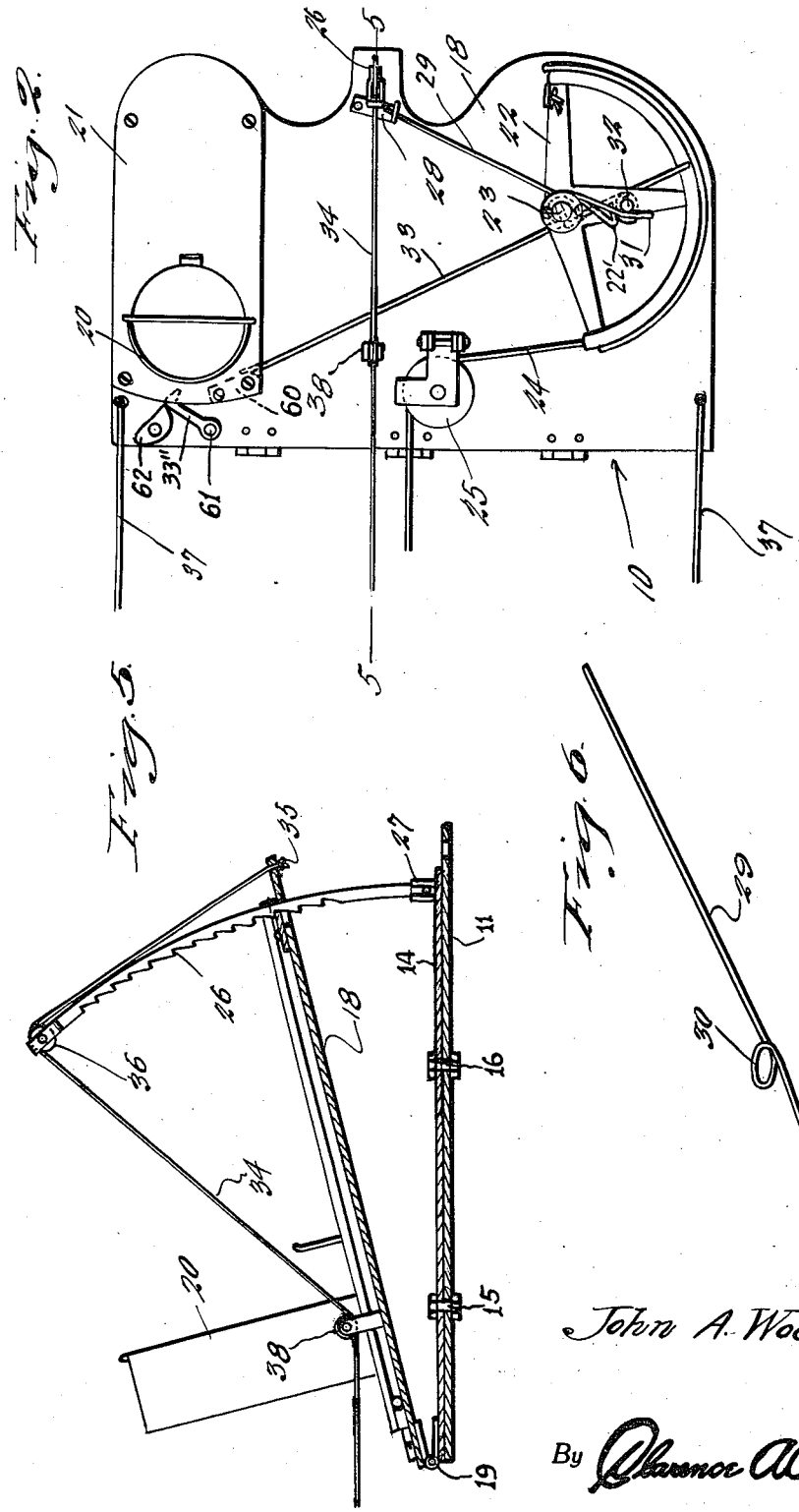

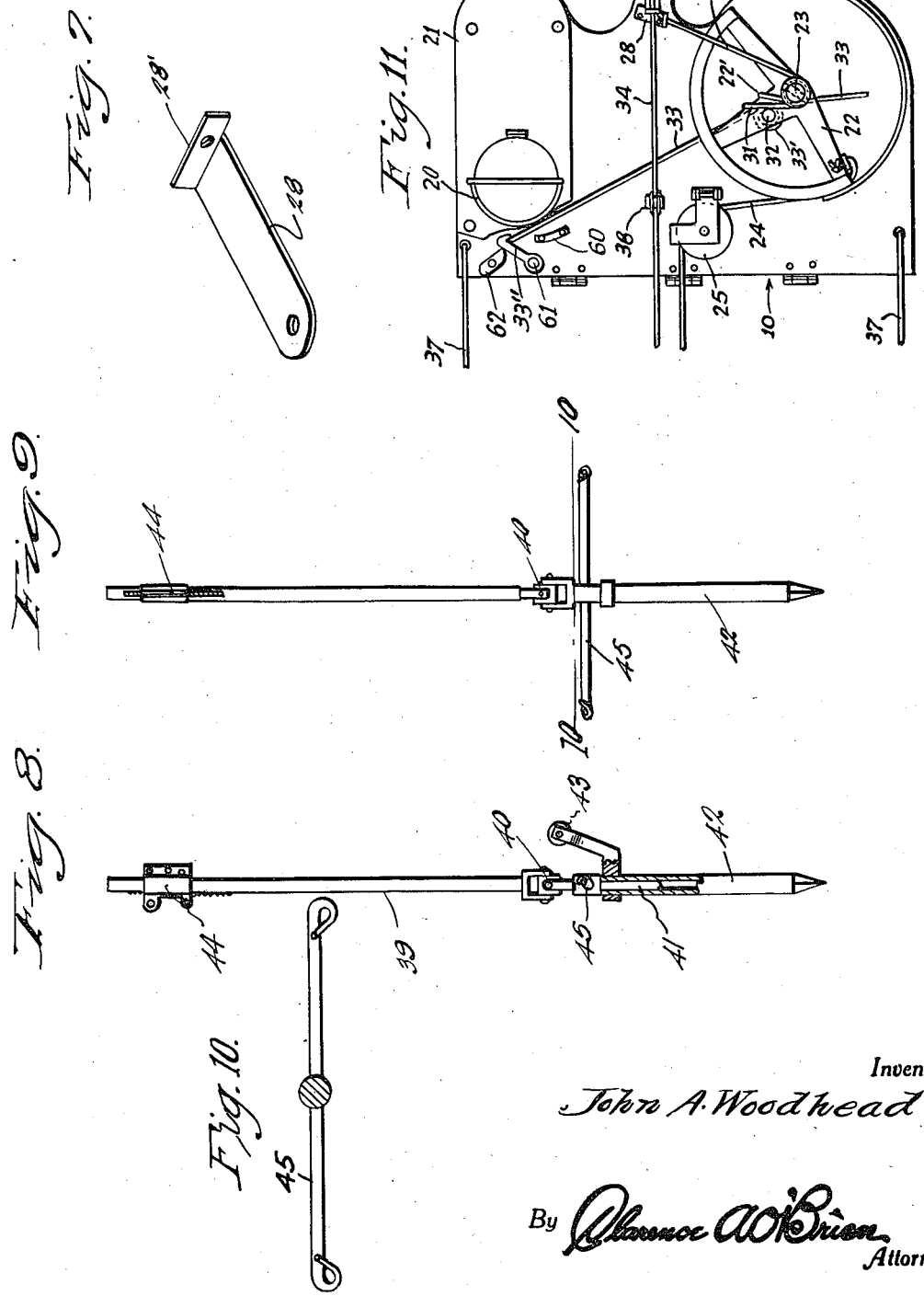

2,018,880

UNITED STATES PATENT OFFICE 2,018,880

TRAP

John A. Woodhead, Swarthmore, Pa.

Application November 16, 1933, Serial No. 698,341

3 Claims. (Cl. 124—5)

This invention relates broadly to traps of the class used in target shooting, and the primary object of the invention is to improve upon a well known type of such traps, now commonly used, and popularly known as the "Peter Duvrock Trap" which forms the subject matter of the patent to J. T. Dickman, dated May 13, 1930, No. 1,758,032.

The present invention has reference to improved means for mounting the trap, means for remotely adjusting the angle of inclination of the trap, together with novel and efficient means for swinging the trap either to the right or left; as will be best understood from a study of the following description taken in connection with the accompanying drawings wherein:

Figure 1 is a side elevational view of a trap illustrating the application of the invention.

Figure 2 is a top plan view thereof.

Figure 3 is a plan view of the base plate of the trap.

Figure 4 is a plan view of one of the hingedly connected members of the trap.

Figure 5 is a detail sectional view taken substantially on the line 5—5 of Figure 2.

Figure 6 is a perspective view of a spring to be hereinafter more fully referred to.

Figure 7 is a perspective view of a locking dog.

Figure 8 is a view of the control rod, certain parts being broken away and shown in section.

Figure 9 is a view of the control rod taken at right angles to Figure 8, and

Figure 10 is a sectional view taken substantially on the line 10—10 of Figure 9.

Figure 11 is a top plan view of the trap showing the parts in position in the act of flexing the spring rod.

With reference more in detail to the drawings it will be seen that the trap indicated generally by the reference numeral 10 comprises a base plate 11 which is preferably of the shape shown, (substantially triangular) and at the apex or forward end thereof is provided with an integral apertured tongue 12 for accommodating an anchoring spike 13. Mounted on the plate for swinging movement to the right or left is a plate member 14 that is swingable about a pivot 15 and is limited in its swinging movement through the medium of a bolt 16 rising from the plate 11 and operating in an arcuate slot 17 provided in the plate 14.

Said plate 14 is hinged to the rear or base edge of the plate 18 by means of hinges 19.

On the plate 18 is mounted the usual trap mechanism which includes the magazine 20 for the "clay pigeons" or targets, the guide and delivery structure 21 associated with the magazine 20, the segmental wheel 22 that is journalled on a vertical stub shaft 23 and over which is trained the operating cable 24 one end of which is suitably secured to the wheel. The trap mechanism also includes the spring 22' which is coiled around the hub of the wheel and has one end fixed to the stub shaft 23 and its other end held in tension by engaging a part of the wheel so that this spring 22' acts to hold the wheel in neutral or inoperative position. A spring rod 33 is provided with an eye 33', spaced nearer to one end than the other end of the rod and encircles the enlarged lower end of a stud 32 carried by one of the spokes of the wheel. Said other end of the rod 33 engages the guide 60.

Initially the functioning end of spring rod 33 rests upon the guide 60, and when the wheel is rotated, said end is moved therealong and is guided thereby under the lowermost disk or "pigeon" and into position under the upper hooked portion of a catch 33'' pivoted to the base at 61. The position of this catch is such that the end of the rod engages thereunder at approximately the point of maximum throw of the stud 32, and the extent of the rod end to be engaged thereunder may be regulated by means of a cam 62 pivoted to the base so that said catch may be moved either to the right or to the left, whereby the spring rod will disengage said catch under more or less flexure as desired.

In operating the trap, the cable line 24 is pulled to cause the wheel 22 to swing about its pivot. This movement causes the spring rod 33 to advance along the guide 60 and also to swing with its pivot 32 as said pivot describes an arc of a circle during swinging movement of the tensioning member. The left or functioning end of the spring rod 33 thus passes under the lowermost disk and is guided into position under the catch 33'' when the pivot 32 reaches its limit of throw about as indicated in Fig. 2. Immediately thereafter, the right end of the rod 33 which projects beyond the pivot 32 is moved into engagement with the under side of the stub shaft 23 of the wheel, see Fig. 11, whereupon further movement of the wheel and of the pivot 32 causes the rod 33 to be flexed and tensioned. As flexure increases, the effective length of the spring rod is reduced until it is withdrawn from engagement with the tip of catch 33''. Upon release of the spring rod 33, the energy developed by the flexure causes the spring rod to snap up and project the disk from the trap into the air. The spring 22' returns the wheel to initial position thereby allowing the spring rod 33 to drop back upon the guide 60. Since gravity immediately feeds another disk into position, it in turn may be projected immediately upon return of the wheel, thus making possible the rapid projection of successive disks. To reduce the extent of projection, the cam 62 may be adjusted so that the rod 33 will disengage the catch with less flexure and therefore with less developed power, while the range may be increased by advancing the cam so as to require greater flexure for release. Also there is provided the usual guide pulley 25 for the cable 24. This trap mechanism forms the subject matter of the beforementioned patent to Dickman and it is not thought that a further description of the same is necessary.

As a part of the mechanism for holding the plate 18 at the desired angle of inclination there is provided the arcuate rack bar 26 which has one end suitably fitted in a socket 27 carried by the plate 14. The plate 18 is provided at its forward end with an aperture for accommodating rack bar 26, and in the present instance there is pivoted to the top of the plate 18 adjacent said aperture a locking dog 28 that is engageable with the teeth of the rack bar 26 for holding the plate 18 at the desired adjustment.

Further in accordance with the present invention there is provided a spring member 29 which adjacent one end is looped as at 30 about the hub of the wheel 22, and at said one end, 31 is suitably engaged behind a pin 32 provided on a spoke of the wheel 22. At its free end the spring 29 is engaged in an aperture provided in an upstanding flange 28' provided on the free edge of the dog 28. When the wheel 22 is moved in a clockwise direction by a pull upon the cable 24, the spring member 29 will be tensioned so that the dog 28 will be swung against the rack 26, into engagement with one of the teeth of the rack and due to the shape of the teeth, the engagement of the dog with a tooth thereof will prevent further upward movement of the base or plate 18.

For adjusting the plate 18 there is provided a cable 34 which at one end is secured as at 35 to the forward edge of the plate 18 and is trained over a suitable pulley 36 mounted on the upper end of the rack bar 26.

For swinging the plate 14 together with the plate 18 and the mechanism of the trap associated therewith either to the right or left there are provided pull cables 37 which are secured at one end to the plate 18 at opposite end edges thereof.

As will be clear from a study of Figure 1 cables 24, 34 and 37 extend rearwardly, the cable 34 passing under a guide pulley 38 suitably mounted on the plate 18 adjacent the end edge of the plate.

Rearwardly of the trap and located a sufficient distance therefrom is a control rod 39 which has a pivotal connection 40 with a stem 41 that fits into the socketed upper end of a stake 42 that is driven in the ground as is apparent. On the upper end of the stake 42 is a bracket carrying a suitable guide pulley 43 for the cable 34 which cable is secured at its rear end to an adjustment sleeve 44 slidably mounted on the control rod 39. The cable 24 is secured at its rear end to the upper end of the rod 39 while the rear ends of the cables 37 are secured as suggested with the eye equipped ends of a cross bar 45 extending laterally of the pin 41.

The parts are set up in the field where the shooting is to take place and when the control rod 39 is in vertical position, there is a slight pull on the cable 24 so that the wheel 22 is moved slightly in a clockwise direction but not sufficiently to cause the spring 29 to move the dog 28 into engagement with the rack bar. Then, the sleeve 44 is adjusted to set the base plate 18 at the desired inclination and the control rod 45 is rotated right or left to set the trap at the desired angle horizontally. Then the control rod or stick 39 is pushed forwardly to slack the cable 24 which permits the spring 22' to move the wheel counterclockwise to its inoperative or neutral position. Then the control rod is pulled backward and when it just passes the vertical position, the spring 29 moves the dog 28 into engagement with a tooth on the rack bar, thus preventing further raising of the base plate 18 which might occur from the cables 24 or 34 as the stick is moved further backward. This additional backward movement of the stick operates the ejecting mechanism of the trap. In order to repeat, all one needs to do is to return the control stick to the vertical position, set the controls as before and keep repeating as often as one wishes.

It will thus be seen that remote control means is now provided, in accordance with the present invention for not only releasing the target but also for adjusting the angle of inclination of the plate 18 as well as for turning said plate 18 and its associated parts either to the right or left for varying the directions of the projected target. Under such conditions it will be apparent that the flight may be determined at will. To hide from view of the marksman the adjustments made there is provided rearwardly of the trap a suitable shield 46. As shown the shield 46 is vertically disposed and is substantially semi-cylindrical in form. The shield 46 is formed from canvas set in a suitable metallic frame the base of which is provided with anchoring spikes 47 adapted to penetrate the ground for anchoring the shield in position. The shield is also provided with suitable openings 48, 49 and 50 for accommodating the cables 24, 34 and 37.

Having thus described my invention, what I claim as new is:

1. In a target trap including target ejecting mechanism, a base member, means for pivotally connecting the trap with the base member for movement about a vertical axis, means for connecting the trap to the base member for tilting movement, a remote control stick, means for supporting the same for tilting movement in all directions, and for rotary movement, means operated by rotary movement of the stick for adjusting the trap about its vertical axis, means for operating the ejector mechanism by tilting movement of the stick, a slide on the stick and means operated by movement of the slide for adjusting the angle of inclination of the trap.

2. In a target trap including target ejecting mechanism, a base member to which one end of the trap is hinged, a second base member to which the first base member is pivoted for movement about a vertical axis, a substantially vertically arranged arcuate rack bar carried by the first base member, a dog carried by the trap and engaging the rack bar, a remote control stick supported for rotary movement and for tilting movement, a cross arm connected with the stick, cables connecting the ends of the cross arm to the trap for moving the trap on the vertical axis when the stick is partly rotated, a slide on the stick, a cable connecting the slide with the trap for adjusting the angle of inclination of the trap when the slide is moved, said trap including a wheel forming part of the ejector mechanism, a cable connected with the wheel and with the upper end of the stick and a spring connected with the wheel and engaging the dog, said spring holding the dog out of engagement with the rack when the stick is vertical and causing the dog to engage the rack when the stick is tilted rearwardly.

3. In a target trap including target ejecting mechanism, a base member to which one end of the trap is hinged, a second base member to which the first base member is pivoted for movement about a vertical axis, a substantially vertically arranged arcuate rack bar carried by the first base member, a dog carried by the trap and engaging the rack bar, a remote control stick supported for rotary movement and for tilting movement, a cross arm connected with the stick, cables connecting the ends of the cross arm to the trap for moving the trap on the vertical axis when the stick is partly rotated, a slide on the stick, a cable connecting the slide with the trap for adjusting the angle of inclination of the trap when the slide is moved, said trap including a wheel forming part of the ejector mechanism, a cable connected with the wheel and with the upper end of the stick and a spring connected with the wheel and engaging the dog, said spring holding the dog out of engagement with the rack when the stick is vertical and causing the dog to engage the rack when the stick is tilted rearwardly, and a shield having openings therein for the passage of the cables and shielding the trap from the marksmen.

JOHN A. WOODHEAD.